(12) United States Patent
Black et al.

(10) Patent No.: US 11,436,673 B2
(45) Date of Patent: Sep. 6, 2022

(54) CONSOLIDATED ORDER BOOK FROM MULTIPLE ASSET EXCHANGES

(71) Applicant: tZERO IP, LLC, New York, NY (US)

(72) Inventors: Tron Black, Sandy, UT (US); Denny Becker, Salt Lake City, UT (US); Stephen Christensen, Salt Lake City, UT (US)

(73) Assignee: tZERO IP, LLC, New York, NY (US)

( * ) Notice: Subject to any disclaimer, the term of this patent is extended or adjusted under 35 U.S.C. 154(b) by 0 days.

(21) Appl. No.: 16/353,950

(22) Filed: Mar. 14, 2019

(65) Prior Publication Data

US 2019/0287174 A1 Sep. 19, 2019

Related U.S. Application Data

(60) Provisional application No. 62/643,638, filed on Mar. 15, 2018.

(51) Int. Cl.
| | |
|---|---|
| *G06Q 40/04* | (2012.01) |
| *H04L 9/06* | (2006.01) |
| *G06Q 40/06* | (2012.01) |
| *H04L 9/32* | (2006.01) |
| *H04L 9/00* | (2022.01) |

(52) U.S. Cl.
CPC .......... *G06Q 40/04* (2013.01); *G06Q 40/06* (2013.01); *H04L 9/0637* (2013.01); *H04L 9/3239* (2013.01); *H04L 9/50* (2022.05)

(58) Field of Classification Search
CPC ........ G06Q 40/06; G06Q 40/04; G06Q 40/00
See application file for complete search history.

(56) References Cited

U.S. PATENT DOCUMENTS

| | | | |
|---|---|---|---|
| 6,278,982 B1 * | 8/2001 | Korhammer | G06Q 40/04 705/36 R |
| 7,895,112 B2 | 2/2011 | Richmann et al. | |

(Continued)

FOREIGN PATENT DOCUMENTS

| | | |
|---|---|---|
| WO | 2002025535 A1 | 3/2002 |
| WO | 2006108158 A2 | 10/2006 |

OTHER PUBLICATIONS

"CME CF Bitcoin Real Time Index (BRTI)", Crlpto Facilities Digital Assets Unleashed, Mar. 6, 2017, pp. 1-15, Crypto Facilities Ltd.

(Continued)

*Primary Examiner* — Hao Fu
(74) *Attorney, Agent, or Firm* — Fogg & Powers LLC

(57) ABSTRACT

A system includes processor(s), memory(s) and a network interface that receives information regarding a plurality of order books from a plurality of asset exchanges. The processor(s) is configured to update a consolidated order book based on information regarding the plurality of order books for local orders received from users of the system. When a received new order does not match any order in the consolidated order book, the processor(s) is configured to place the new order in at least one of the consolidated order book, a separate local order book, or at least one of the plurality of order books of the plurality of asset exchanges. When the new order matches an order in the consolidated order book, the processor(s) is configured to: communicate a custodial order to the particular asset exchange.

20 Claims, 8 Drawing Sheets

(56) References Cited

U.S. PATENT DOCUMENTS

| | | | | |
|---|---|---|---|---|
| 9,892,460 | B1* | 2/2018 | Winklevoss | G06Q 40/04 |
| 10,121,200 | B1* | 11/2018 | Rapaport | G06Q 40/04 |
| 2004/0143538 | A1* | 7/2004 | Korhammer | G06Q 40/04 |
| | | | | 705/37 |
| 2010/0088212 | A1* | 4/2010 | Czupek | G06Q 40/04 |
| | | | | 705/37 |
| 2010/0185562 | A1 | 7/2010 | Nafeh | |
| 2014/0006251 | A1* | 1/2014 | Lundberg | G06Q 40/04 |
| | | | | 705/37 |
| 2016/0321751 | A1* | 11/2016 | Creighton, IV | G06Q 40/04 |

OTHER PUBLICATIONS

"CME Group and Crypto Facilities Announce Launch of Bitcoin Reference Rate and Real-Time Index", May 2, 2016, pp. 1-2, CNN Money.

"Interactived Data Order Book Consolidator", Mar. 26, 2016, pp. 1-2, Interactive Data.

CME Group, "CME CF Bitcoin Reference Rate & CME CF Bitcoin Real-Time Index", CF Bitcoin Real Time Index and Spot Price, Mar. 13, 2018, pp. 1-5.

CME Group, "CME Group and Crypto Facilities Announce Launch of Bitcoin Reference Rate and Real-Time Index", May 2, 2016, pp. 1-2, CME Group, Inc.

Cryptoninjas, "CME Group waives fees on new bitcoin price indices for 2017", Mar. 17, 2017, pp. 1-6, Vendor Technology.

Infront, "Consolidated Orderbook", Jun. 3, 2014, www.software. infrontservices.com, p. 1.

Omega One, "White Paper Version 1.24", Oct. 23, 2017, pp. 1-37.

Trading Physics, "Historical Consolidated Order Book Data", Aug. 15, 2011, pp. 1-2, www.wiki.tradingphysics.com.

International Searching Authority, "International Search Report and Written Opinion from PCT Application No. PCT/US2019/022336 dated Jul. 2, 2019", from Foreign Counterpart to U.S. Appl. No. 16/353,950, pp. 1-11, Published: WO.

European Patent Office, "Extended European Search Report from U.S. Appl. No. 16/535,950", dated Dec. 7, 2021,from Foreign Counterpart to U.S. Appl. No. 16/535,950, pp. 1 through 9, Published: EP.

* cited by examiner

CONSOLIDATED ORDER BOOK FROM MULTIPLE ASSET EXCHANGES

CROSS-REFERENCE TO RELATED APPLICATIONS

This application claims the benefit of U.S. Provisional Patent Application Ser. No. 62/643,638 filed on Mar. 15, 2018, entitled "CONSOLIDATED ORDER BOOK FROM MULTIPLE ASSET EXCHANGES", the entirety of which is incorporated herein by reference.

BACKGROUND

Assets can be bought and sold on asset exchanges. An exchange can maintain a database of orders that are awaiting execution.

SUMMARY

A system that includes at least one processor and at least one memory communicatively coupled to the at least one processor is disclosed. The system also includes at least one network interface communicatively coupled to the at least one processor and configured to receive information regarding a plurality of order books from a plurality of asset exchanges. The at least one processor is configured to receive the information regarding the plurality of order books for the plurality of asset exchanges from the at least one network interface. The at least one processor is also configured to update a consolidated order book based on information regarding the plurality of order books for the plurality of asset exchanges and for local orders received from users of the system. The at least one processor is also configured to track any resting orders on the plurality of order books from the plurality of asset exchanges and any local resting orders resulting from local orders received from users of the system.

When a new order is received from a user of the system, the at least one processor is configured to determine whether the new order matches any orders in the consolidated order book. When the new order does not match any order in the consolidated order book, the at least one processor is configured to place the new order in at least one of the consolidated order book, a separate local order book, or at least one of the plurality of order books of the plurality of asset exchanges. When the new order matches an order in the consolidated order book that corresponds to a particular order on a particular order book of a particular asset exchange of the plurality of asset exchanges, the at least one processor is configured to communicate a custodial order to the particular asset exchange to attempt to match the new order on the particular asset exchange using custodial assets for the user of the system. When the custodial order matches the particular order on the particular asset exchange and a transaction of the custodial order and the particular order on the particular asset exchange is executed using the custodial assets for the user of the system, the at least one processor is configured to remove the new order from the consolidated order book corresponding to the particular order on the particular asset exchange. When the custodial order does not match the particular order on the particular asset exchange or the transaction of the custodial order and the particular order on the particular asset exchange is not executed, the at least one processor is configured to place the new order in at least one of the consolidated order book, a separate local order book, or at least one of the plurality of order books of the plurality of asset exchanges.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
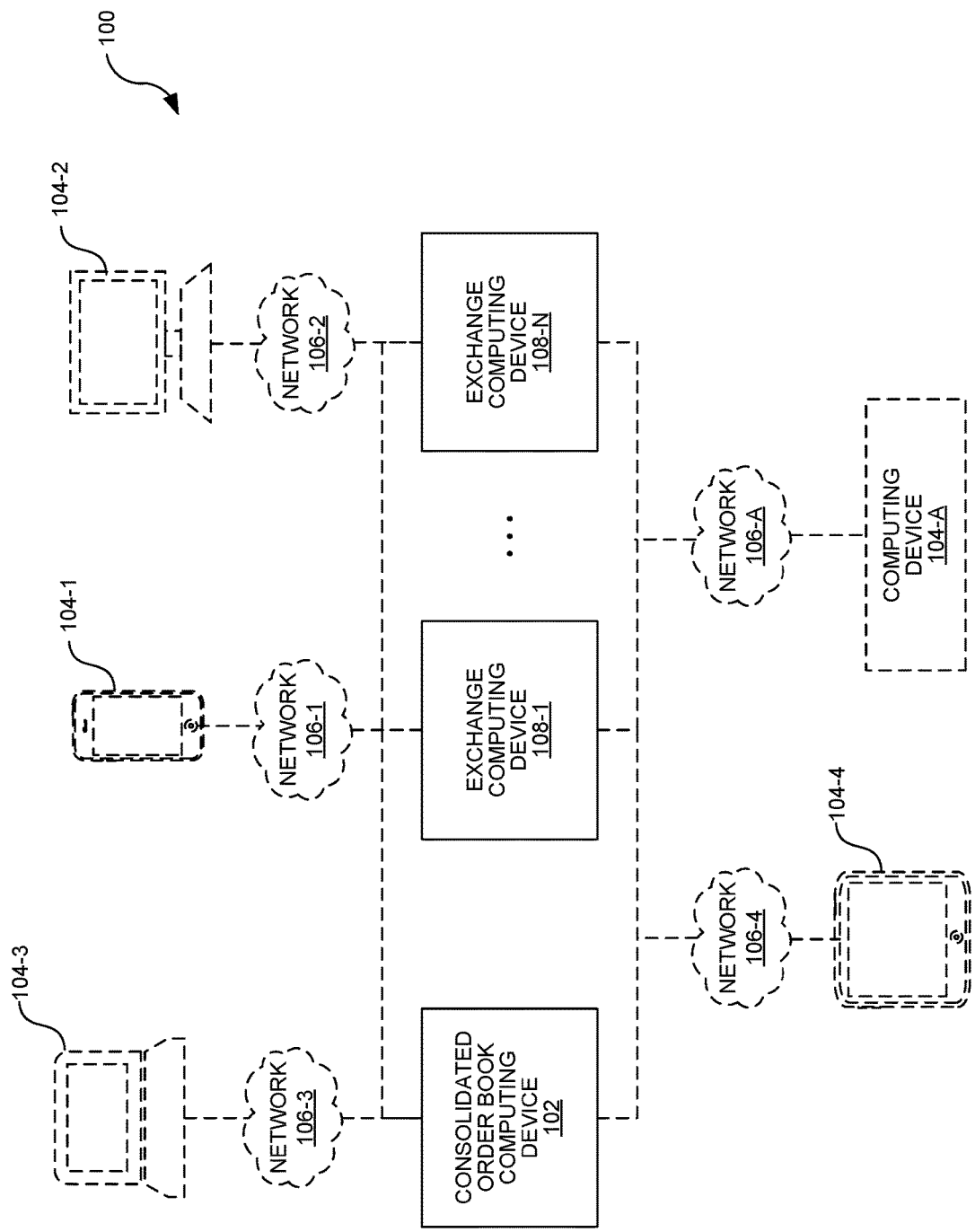
FIG. 1 is block diagram of an example system for utilizing a consolidated order book with multiple asset exchanges.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Assets can be traded (e.g., bought and sold) on asset exchanges. This includes two corresponding orders (e.g., buy 10 units, sell 10 units) being first matched with each other, then executed. One difficulty with asset exchanges can be matching orders together before execution. In examples, multiple asset exchanges may execute orders for an asset, e.g., securities, bonds, fiat currency, cryptocurrency, digital currency, commodity currency, etc. A first asset exchange may hold a first user's open order for purchase of the asset, while a second asset exchange may hold a second user's open order for sale of the asset. Unless the two asset exchanges coordinate with each other, both orders are at risk of not being executed. Such liquidity problems may be resolved by matching orders across multiple asset exchanges. In order to facilitate inter-exchange matching, a consolidated order book may be used. The consolidated order book may aggregate open orders resting on multiple asset exchanges. By allowing inter-exchange matching, liquidity of an asset may be increased. In examples, this may allow users to execute transactions between cryptocurrency and other currency, e.g., Bitcoin to U.S. dollars or vice versa. Additionally, the present systems and methods may enable transactions between different cryptocurrencies, e.g., Bitcoin to Ethereum or vice versa.

Furthermore, the consolidated order book may be updated as orders are added to, removed from, or modified in the order books of the particular asset exchanges. Therefore, the consolidated order book may be an accurate, real-time representation of order books for multiple asset exchanges. This may facilitate fast and accurate matching of orders across multiple asset exchanges.

Furthermore, each asset exchange facilitating an order execution may charge one or both counterparties a transaction fee. Many smaller transactions across asset exchanges can increase transactional costs. Accordingly, it may be beneficial to consolidate orders before execution. In such a custodial/escrow system, orders may be consolidated once they are matched, then executed periodically. Order(s) may then be executed periodically using custodial funds held on behalf of the user(s). A custodial/escrow system may reduce the total transactions performed and, therefore, reduce the amount of fees incurred. In contrast, a non-custodial system may place and execute each individual order, which may result in greater transaction costs.

In examples, the present systems and methods may be used with cryptocurrency exchanges. Using the custodial/escrow model, new orders may be consolidated together before they are executed and recorded on a blockchain. In contrast, a non-custodial model may execute each individual order and record it on the blockchain. Therefore, the non-custodial model would result in higher total transaction costs (e.g., fees charged by exchanges) than the custodial model of the present systems and methods.

FIG. 1 is block diagram of an example system 100 for utilizing a consolidated order book with multiple asset exchanges. System 100 includes a consolidated order book computing device 102, a plurality of optional customer computing devices 104 (such as optional customer computing devices 104-1 through optional customer computing devices 104-A), and a plurality of exchange computing devices 108 (such as exchange computing devices 108-1 through exchange computing devices 108-N).

Each of consolidated order book computing device 102, customer computing devices 104, and exchange computing devices 108 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each customer computing device 104 may be communicatively coupled to the consolidated order book computing device 102 and/or the exchange computing devices 108 using at least one network 106 (such as network 106-1 through network 106-A).

In examples, the at least one network 106 includes at least one wired network and/or at least one wireless network. In examples, any combination of wired and wireless networks is used to couple the customer computing devices 104 to the consolidated order book computing device 102 and to couple the consolidated order book computing device 102 to the plurality of exchange computing devices 108. In examples, the at least one network 106 includes at least one of at least one local area network (LAN), at least one wide area network (WAN), or the Internet. In examples, any combination of local area networks, wide area networks, or the Internet is used as the at least one network 106 to couple the consolidated order book computing device 102 with customer computing devices 104 and/or exchange computing devices 108. In examples, each of the consolidated order book computing device 102, customer computing devices 104 and exchange computing devices 108 include at least one memory, at least one processor, at least one optional network interface, at least one optional display device, at least one optional input device, and at least one power source.

Figure 2:
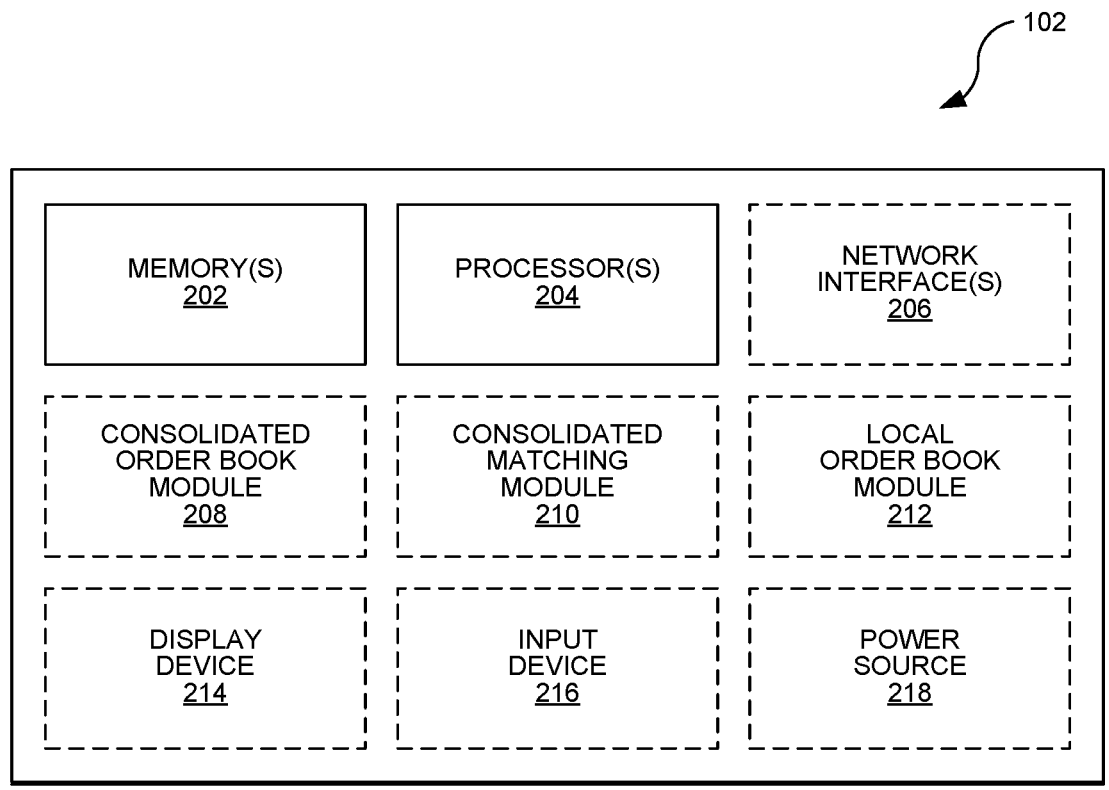
FIG. 2 is a block diagram of an example consolidated order book computing device used in the system of FIG. 1 for utilizing a consolidated order book with multiple asset exchanges.
Figure 3:
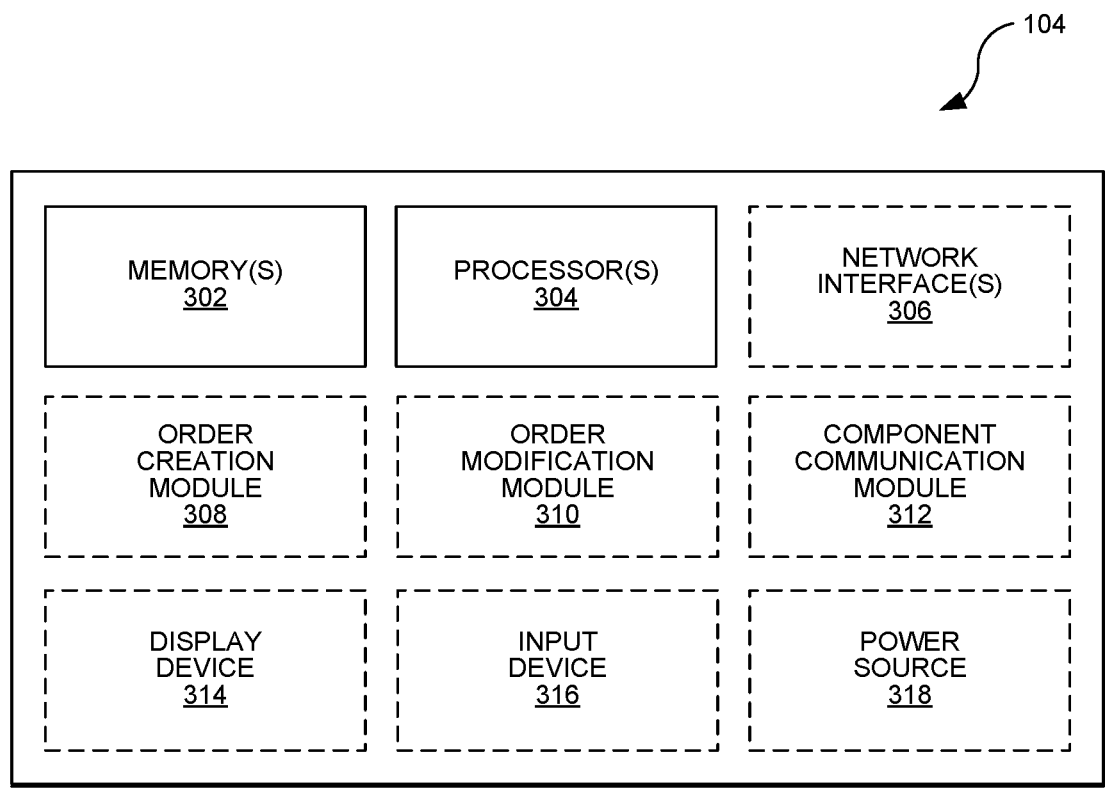
FIG. 3 is a block diagram of an example customer computing device used in the system of FIG. 1 for utilizing a consolidated order book with at least one asset exchange.
Figure 4:
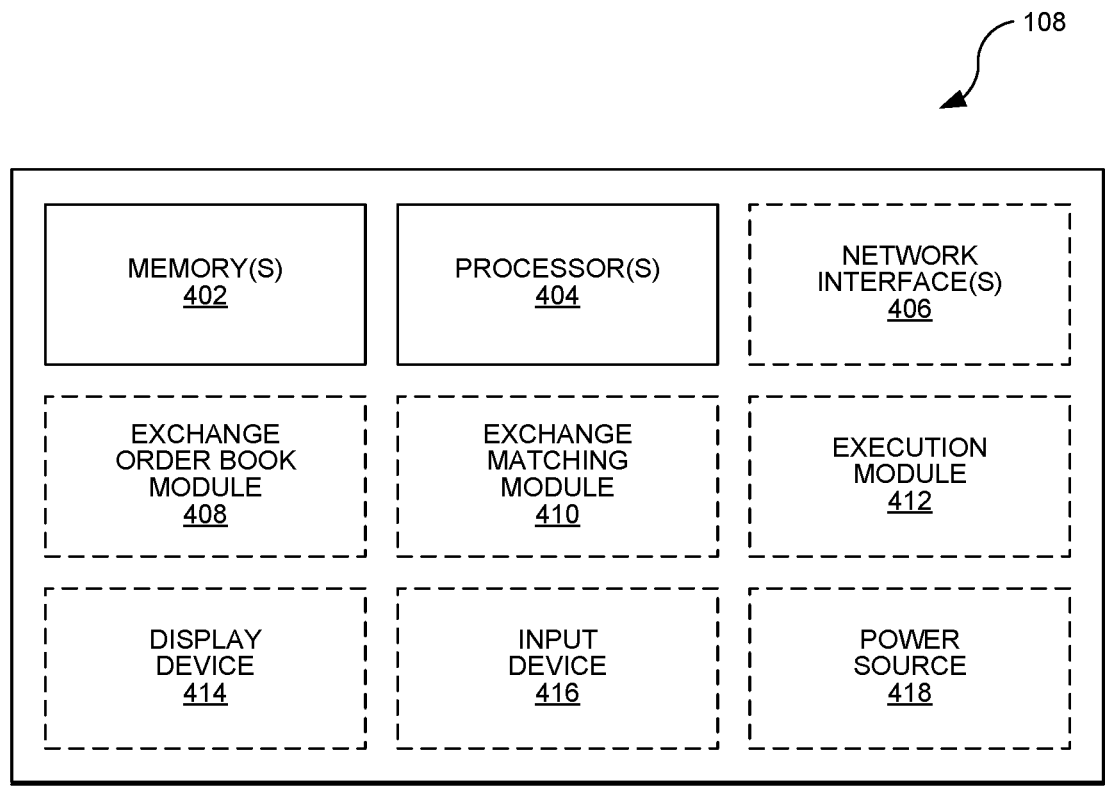
FIG. 4 is a block diagram of an example exchange computing device used in the system of FIG. 1 for utilizing a consolidated order book with at least one asset exchange.

FIGS. 2-4 are block diagrams of example computing devices. FIG. 2 is a block diagram of an example consolidated order book computing device 102 used in the system 100 of FIG. 1 for utilizing a consolidated order book with multiple asset exchanges. Consolidated order book computing device 102 includes at least one memory 202, at least one processor 204, optional at least one network interface 206, optional consolidated order book module 208, optional consolidated matching module 210, optional local order book module 212, optional display device 214, optional input device 216, and optional power source 218.

FIG. 3 is a block diagram of an example customer computing device 104 used in system 100 for utilizing a consolidated order book with at least one asset exchange. Customer computing device 104 includes at least one memory 302, at least one processor 304, optional at least one network interface 306, optional order creation module 308, optional order modification module 310, optional component communication module 312, optional display device 314, optional input device 316, and optional power source 318.

FIG. 4 is a block diagram of an example exchange computing device 108 used in system 100 for utilizing a consolidated order book with at least one asset exchange. Exchange computing device 108 includes at least one memory 402, at least one processor 404, optional at least one network interface 406, optional exchange order book module 408, optional exchange matching module 410, optional execution module 412, optional display device 414, optional input device 416, and optional power source 418.

In examples, the at least one memory 202, the at least one memory 302 and/or the at least one memory 402 can be any device, mechanism, or populated data structure used for storing information. In examples, the at least one memory 202, the at least one memory 302, and/or the at least one memory 402 can be or include any type of volatile memory, nonvolatile memory, and/or dynamic memory. In examples, the at least one memory 202, the at least one memory 302, and/or the at least one memory 402 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 202, the at least one memory 302 and/or the at least one memory 402 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 202, the at least one memory 302 and/or the at least one memory 402. The at least one memory 202, the at least one memory 302 and/or the at least one memory 402 may be used to store instructions for running one or more applications or modules on the at least one processor 204, the at least one processor 304, and/or the at least one processor 404. In examples, the at least one memory 202 could be used in one or more examples to house all or some of the instructions needed to execute the functionality of the optional consolidated order book module 208, the optional consolidated matching module 210, and the optional local order book module 212. Similarly, the at least one memory 302 could be used in one or more examples to house all or some of the instructions needed to execute the functionality of the optional order creation module 308, the optional order modification module 310, and the optional component communication module 312. Similarly, the at least one memory 402 could be used in one or more examples to house all or some of the instructions needed to execute the functionality of the optional exchange order book module 408, the optional exchange matching module 410, and the optional execution module 412.

The at least one processor 204, the at least one processor 304, and/or the at least one processor 404 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the at least one consolidated order book module 208, consolidated matching module 210, and/or local order book module 212 are implemented by the at least one processor 204 and the at least one memory 202. In examples, any of the at least one order creation module 308, order modification module 310, and/or component communication module 312 are implemented by the at least one processor 304 and the at least one memory 302. In examples, any of the at least one exchange order book module 408, exchange matching module 410, and/or execution module 412 are implemented by the at least one processor 404 and the at least one memory 402.

In examples, the at least one optional network interface 206 includes or is coupled to at least one optional antenna for communication with a network (such as one of the at least one networks 106 of system 100). In examples, the at least one optional network interface 306 includes or is coupled to at least one optional antenna for communication with a network (such as one of the at least one networks 106 of system 100). In examples, the at least one optional network interface 406 includes or is coupled to at least one optional antenna for communication with a network (such as one of the at least one networks 106 of system 100). In examples, the at least one optional network interface 206, the at least one optional network interface 306, and/or the at least one optional network interface 406 includes at least one of an Ethernet interface, a cellular radio access technology (RAT) radio, a WiFi radio, a Bluetooth radio, or a near field communication (NFC) radio. In examples, the at least one optional network interface 206, the at least one optional network interface 306, and/or the at least one optional network interface 406 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 206, the at least one optional network interface 306, and/or the at least one optional network interface 406 includes a WiFi (IEEE 502.11) radio configured to communicate with a wireless local area network that communicates with the remote server, rather than a wide area network. In examples, the at least one optional network interface 206, the at least one optional network interface 306, and/or the at least one optional network interface 406 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 214, the optional at least one display device 314, and/or the optional at least one display device 414 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 216, the optional at least one input device 316, and/or the optional at least one input device 416 includes at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 214, the optional at least one display device 314, and/or the optional at least one display device 414 are combined with the optional at least one input device 216, the optional at least one input device 316, and/or the optional at least one input device 416, respectively, into a human machine interface (HMI) for user interaction with the consolidated order book computing device 102, the customer computing device 104, and/or the exchange computing device 108.

In examples, at least one optional power source 218 is used to provide power to the various components of the consolidated order book computing device 102. In examples, at least one optional power source 318 is used to provide power to the various components of the customer computing device 104. In examples, at least one optional power source 418 is used to provide power to the various components of the exchange computing device 108.

As used herein, the term "asset exchange" refers to a marketplace (and/or a business entity that operates the marketplace) in which securities, commodities, derivatives and/or other financial instruments are traded. In examples, the asset exchanges described herein may serve as a marketplace for cryptocurrency, digital currency, fiat currency, and/or commodity currency. In examples, the one or more of the asset exchanges described herein may record successfully executed transactions on a distributed ledger, e.g., a blockchain. Alternatively, or in addition to, the asset exchanges may be configured to trade at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund. Each exchange computing device 108 herein may correspond to, and/or be operated by, a particular asset exchange. Accordingly, the terms "asset exchange" and "exchange computing device 108" may be used interchangeably.

As used herein, the term "order" refers to a request to initiate a transaction or data that describes a request to initiate a transaction. An order may be a request to trade any type of asset, including but not limited to, securities, bonds, currencies, real property, personal property, goods, funds and/or other assets. In examples, an order may be at least one of a buy, sell, and/or hold order. In examples, an order may include public addresses for accounts participating in the trade (such as a transmitting account and/or a target account), an indication of the asset being traded, and/or the quantity of the asset being traded. The order may also indicate optional attributes, such a limit price, stop price, conditional triggering requirements, duration of the order, whether the order may be partially filled, etc. In examples, the at least one optional input device and the at least one optional display device may be used by a user to create the order. In examples (such as where market timing is important to the user), each order can be sent immediately from a customer computing device 104 to the consolidated order book computing device 102 or an asset exchange. Alternatively, a user may enter an order directly on the consolidated order book computing device 102 or an asset exchange.

As used herein, the term "order book" refers to a collection of orders. The order book may be stored in a memory, e.g., one or more disk drives, flash drives, one or more databases, one or more tables, one or more files, local cache memories, processor cache memories, relational databases, flat databases, and/or the like.

As used herein, unless otherwise specified, the term "user of the system" (or simply "user") refers to a person (or automated instructions, e.g., a script) that accesses, either directly or indirectly, the consolidated order book computing device 102, a customer computing device 104, and/or an exchange computing devices 108 to create, cancel, or modify an order.

The at least one processor 204 of the consolidated order book computing device 102 may be configured to generate, use and/or update a consolidated order book. The consolidated order book may be generated and updated based on information regarding a plurality of order books (e.g., residing on a plurality of exchange computing devices 108) and local orders received from users of the system 100. In examples, the consolidated order book may be implemented in the consolidated order book module 208.

The at least one processor 204 may also be configured to receive a new order from a user of the system 100, e.g., based on user input and/or automated instructions. Upon receiving a new order from an asset exchange, the at least one processor 204 may first determine whether the new order matches any orders in the consolidated order book. In examples, the matching may be implemented in the consolidated order book module 208.

The at least one processor 204 may determine whether the new order matches any orders in the consolidated order book in any suitable manner, e.g., complete matches, aggregated partial matches, etc. In examples, the at least one processor 204 may determine whether the new order partially matches a plurality of orders in the consolidated order book that correspond to a plurality of orders on at least one particular order book of at least one particular asset exchange. If so, and if execution of the plurality of partially-matched orders would effectively result in a complete match, the at least one processor 204 may consider the plurality of partial matches to be a match. In such a case, the at least one processor 204 may communicate a plurality of custodial orders to the at least one particular asset exchange to attempt to match a plurality of portions of the new order with a plurality of orders on the at least one particular order book of the at least one particular asset exchange. A plurality of transactions for the plurality of custodial orders and the plurality of orders on the at least one particular order book may be executed. If the plurality of custodial orders are matched and executed by the particular asset exchange, the at least one processor 204 may remove the new order from the consolidated order book corresponding to the plurality of orders on the at least one particular order book. However, when only a subset of the plurality of custodial orders are matched and executed, the at least one processor 204 may adjust the new order based on the subset of the plurality of custodial orders that are matched and executed. The portion of the new order remaining, after the subset of the plurality of custodial order are matched and executed, may be stored in the consolidated order book, local order book, or an order book on one of the asset exchanges.

In some cases, there may be multiple ways to match the new order to existing order(s) in the consolidated order book. In examples, a new order may match a single order in the consolidated order book as well as partially match a plurality of orders in the consolidated order book (that correspond to a plurality of orders on at least one particular order book of at least one particular asset exchange). If execution of the plurality of partially-matched orders would effectively result in a complete match, the at least one processor 204 may select the plurality of partially-matching orders (instead of the matching single order) in the consolidated order book for execution. In such a case, the at least one processor 204 may communicate a plurality of custodial orders to the at least one particular asset exchange to attempt to match a plurality of portions of the new order with a plurality of orders on the at least one particular order book of the at least one particular asset exchange and execute a plurality of transactions for the plurality of custodial orders and the plurality of orders on the at least one particular order book. Alternatively, the at least one processor 204 may select the matching single order for execution.

When the new order does not match any order in the consolidated order book, the at least one processor 204 may place the new order in the consolidated order book, a separate local order book on the consolidated order book computing device 102, or at least one of the order books of an asset exchange. In examples, the local order book may be implemented in the local order book module 212.

In examples, the consolidated order book computing device 102 may use a separate local order book to store local orders received from users of the system 100 that do not match to any order on the consolidated order book. In such a case, when the new order is received from a user of the system 100, the at least one processor 204 may place the new order in the separate local order book when the new order does not match any order in the consolidated order book.

In other examples, the consolidated order book computing device 102 may use a chosen order book on a chosen asset exchange to store new orders received from users of the system 100 that do not match to any order on the consolidated order book. In this example, when the new order is received from a user of the system 100, the at least one processor 204 may place the new order in the chosen order book of a chosen asset exchange when the new order does not match any order in the consolidated order book.

In other examples, the consolidated order book computing device 102 may use the consolidated order book to store new orders received from users of the system 100 that do not match to any order on the consolidated order book. In this example, when the new order is received from a user of the system 100, the at least one processor 204 may place the new order in the consolidated order book when the new order does not match any order in the consolidated order book.

When a new order (e.g., received at the consolidated order book computing device 102 from a user of the system 100) matches an order in the consolidated order book that corresponds to a particular order on a particular order book of a particular asset exchange, the at least one processor 204 may communicate a custodial order to the particular asset exchange to attempt to match the new order on the particular asset exchange using custodial assets for the user of the system 100. The custodial assets of the system 100 may be stored in an escrow account shared by many users. Therefore, the at least one processor 204 may also be configured to track individual assets, within the custodial assets, for the plurality of users.

When the custodial order matches the particular order on the particular asset exchange and a transaction of the custodial order and the particular order on the particular asset exchange is executed using the custodial assets for the user of the system, the at least one processor 204 may remove the new order from the consolidated order book corresponding to the particular order on the particular asset exchange. This removal may occur through an update of the consolidated order book based on information regarding the order books for the asset exchanges, including the particular order book of the particular asset exchange. The particular order book of the particular asset exchange may also be updated to reflect the matching of the custodial order. In other words, if the custodial order (e.g., sent following successful matching at the custodial order book computing device 102) is successfully matched again at the particular asset exchange, the consolidated order book and the particular order book of the particular asset exchange may both be updated to reflect the subsequent matching and/or execution.

In examples, the consolidated order book computing device 102 may match a particular order on the particular asset exchange, but the resulting custodial order does not match the particular order on the particular asset exchange and the transaction of the custodial order and the particular order on the particular asset exchange is not executed. This subsequent custodial order mismatch (following successful match to the consolidated order book) may occur because the consolidated order book had not yet been updated to show that the matching order had already been removed from the particular order book of the particular asset exchange. Alternatively, or in addition to, the subsequent custodial mismatch may occur because the matching order was removed from the particular order book of the particular asset exchange after it was matched to the new order in the consolidated order book, but before the custodial order matched to the particular order on the particular asset exchange and the transaction of the custodial order and the particular order on the particular asset exchange is executed. In either case, the at least one processor 204 may place the new order in the consolidated order book, the separate local order book on the consolidated order book computing device 102, or at least one of the order books of the plurality of asset exchanges.

In addition to new orders, the at least one processor 204 of the consolidated order book computing device 102 may also be configured to receive information regarding cancelation and/or modification of orders in one or more order books on the exchange computing devices 108. In other words, the at least one processor 204 may be configured to track any resting orders on the plurality of order books on the exchange computing devices 108 and any local resting orders resulting from local orders received from users of the system, i.e., a local order book may be separate from the consolidated order book, but also reside on the consolidated order book computing device 102. In examples, the exchange computing devices 108 may notify the consolidated order book computing device 102 when an order on the exchange order book is created, canceled, and/or modified. Alternatively, the consolidated order book computing device 102 may periodically request, from the exchange computing devices 108, information describing exchange order books.

The at least one processor 304 of the customer computing device 104 may be configured to create orders for the system 100, e.g., based on user input and/or automated instructions. In examples, the order creation may be implemented in the order creation module 308. The order(s) created by the user may relate to cryptocurrency, digital currency, fiat currency, securities, bonds, commodities, real property, personal property, a fund, a currency fund, an exchange traded fund, a mutual fund, an index fund, a bond fund, a commodity fund, and/or a real estate fund. The order(s) created by the user may include public addresses for accounts participating in the trade (such as a transmitting account and/or a target account), an indication of the asset being traded, and/or the quantity of the asset being traded. The order(s) may also indicate optional attributes, such a limit price, stop price, conditional triggering requirements, duration of the order, whether the order may be partially filled, etc. In examples, the at least one optional input device 316 and the at least one optional display device 314 are used by a user to create the order. The at least one processor 304 may also be configured to send the new order to one of the exchange computing devices 108 and, optionally, send the new order to the consolidated order book computing device 102.

The at least one processor 304 may also be configured to modify or cancel the order, e.g., based on further user input and/or automated instructions. Order modification may be implemented in the order modification module 310. Various parameters of an order may be modified without canceling the order, e.g., limit price, a quantity of the asset being traded, whether the user is willing to accept partial fill of the order, duration of the order, etc. When an order is modified or canceled, the at least one processor 304 may also be configured to send a notification of the order modification to one of the exchange computing devices 108 and, optionally, send the consolidated order book computing device 102.

The exchange computing device 108 may correspond to an asset exchange. The asset exchange may serve as a marketplace for orders created by the user for transactions involving cryptocurrency, digital currency, fiat currency, securities, bonds, commodities, real property, personal property, funds, currency funds, exchange traded funds, mutual funds, index funds, bond funds, commodity funds, and/or real estate funds. In examples, the one or more of the asset exchange described herein may record successfully executed transactions (e.g., cryptocurrency transactions) on a distributed ledger, e.g., a blockchain.

The at least one processor 404 of the exchange computing device 108 may be configured to receive a new order. Upon receiving the new order, the at least one processor 404 may update an exchange order book based on the new order. In examples, the exchange order book may be implemented in the exchange order book module 408. The exchange order book may be a collection of orders awaiting execution on the particular asset exchange. The new order may be received from a user of the particular asset exchange (either directly on the exchange computing device 108 or via a customer computing device 104) or received from the consolidated order book computing device 102. Additionally, the at least one processor 404 may also be configured to send a notification of changes (e.g., creation, modification, cancellation of orders) to the exchange order book to the consolidated order book computing device 102 to update the consolidated order book.

The at least one processor 404 may also be configured to receive a custodial order from a consolidated order book computing device 102. The custodial order may be based on a notification of changes sent from the asset exchange to the consolidated order book computing device 102. Alternatively, the custodial order may be generated at the consolidated order book computing device 102 based on a notification or order that the consolidated order book computing device 102 receives from a different asset exchange.

Upon receiving the custodial order, the at least one processor 404 may determine whether the custodial order matches any orders in the exchange order book. In examples, the matching may be implemented in the exchange matching module 410. In examples, the at least one processor 404 may be configured to match one or more custodial orders (received from the consolidated order book computing device 102) with one or more particular orders in the exchange order book. The matching may include matching a plurality of single custodial order to a single order in the exchange order book, a single custodial order to multiple orders in the exchange order book, multiple custodial orders to a single order in the exchange order book, and/or multiple custodial orders to multiple orders in the exchange order book.

When the at least one processor 404 is able to match the one or more custodial orders with one or more particular orders in the exchange order book, the at least one processor 404 may execute a transaction with the custodial order(s) and the particular order(s) in the exchange order book. In examples, execution of trades may be implemented in the execution module 412. When the custodial order(s) match particular order(s) in the exchange order book, the at least one processor 404 may be configured to record the executed transaction using a distributed ledger during execution of the transaction, e.g., on a blockchain.

Additionally, the exchange order book may be used as a resting place for new orders, received at the consolidated order book computing device 102, that do not match any orders in the consolidated order book. In examples, the at least one processor 404 may optionally be configured to receive, from a consolidated order book computing device 102, a new order that corresponds to a custodial order that was not matched by the asset exchange. The at least one processor 404 may also optionally be configured to place the new order, which corresponds to the custodial order that was not matched by the asset exchange, into the exchange order book.

Figure 5:
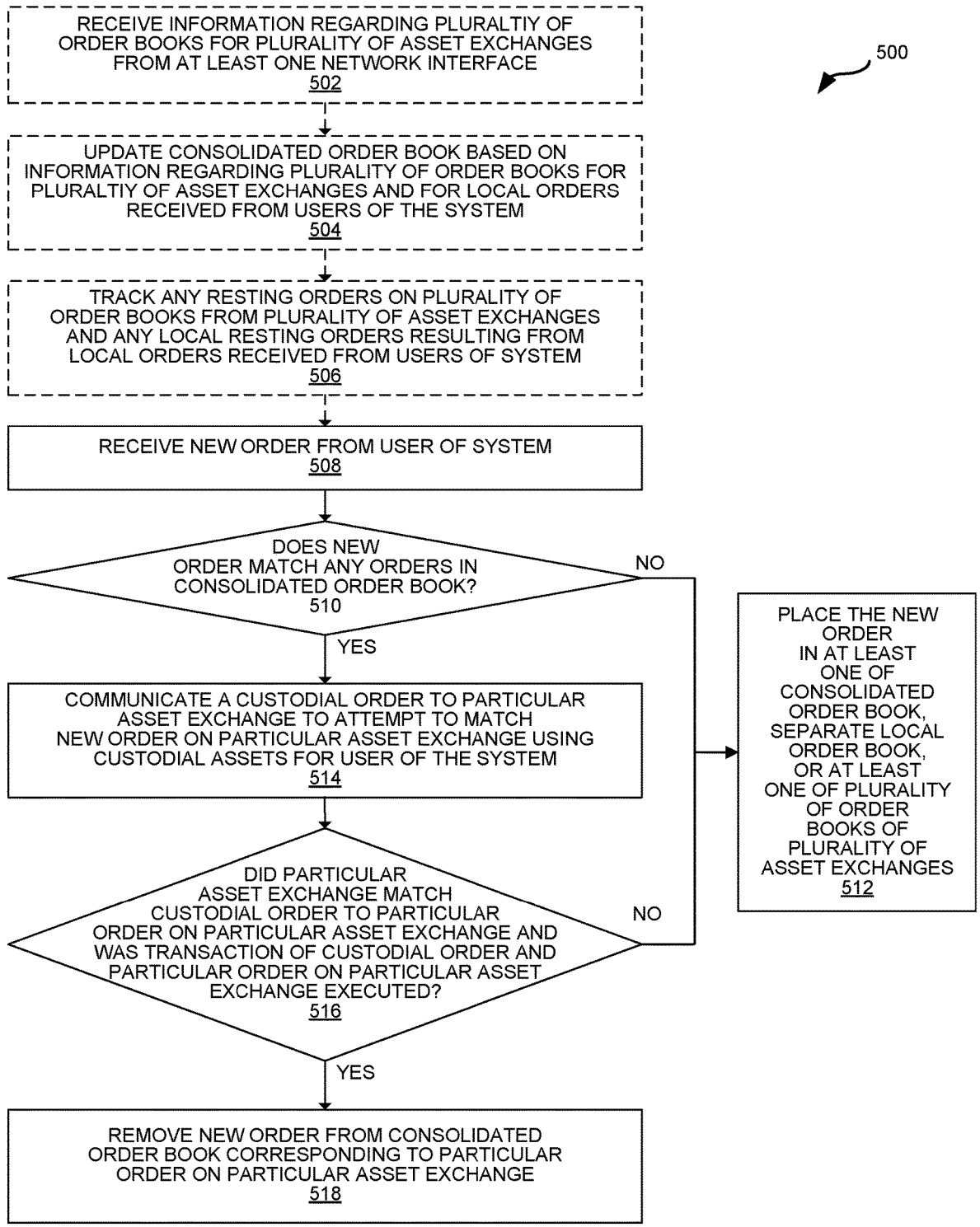
FIG. 5 is a flow diagram of an exemplary method for utilizing a consolidated order book with multiple asset exchanges.

FIG. 5 is a flow diagram of an exemplary method 500 for utilizing a consolidated order book with multiple asset exchanges. The method 500 may be performed by a consolidated order book computing device 102. Specifically, the method 500 may be performed by at least one processor 204 executing instructions stored in at least one memory 202. Optionally, the at least one processor 204 may receive 502 information from a plurality of asset exchanges (e.g., two or more of exchange computing devices 108-1 through 108-N) regarding a plurality of order books for the plurality of asset exchanges. This information may include a notification that an order on an exchange order book has been created, canceled, and/or modified. Optionally, the at least one processor 204 may also update 504 the consolidated order book based on information regarding the plurality of order books for the plurality of asset exchanges and for local orders received from users of the system. The at least one processor 204 may be configured to track 506 any resting orders on the plurality of order books from the plurality of asset exchanges and any local resting orders resulting from local orders received from users of the system.

The at least one processor 204 may also be configured to receive 508 a new order from a user of the system 100, e.g., based on user input and/or automated instructions. Upon receiving the new order, the at least one processor 204 may determine 510 whether the new order matches any orders in the consolidated order book. The consolidated order book may include orders resting on a plurality of order books of a plurality of asset exchanges and local orders received from users of the system 100. The at least one processor 204 may determine whether the new order matches any orders in the consolidated order book by looking for complete matches and/or aggregated partial matches.

When the new order does not match any order in the consolidated order book, the at least one processor 204 may place 512 the new order in the consolidated order book, a separate local order book on the consolidated order book computing device 102, or at least one of the order books in an asset exchange. In examples, the consolidated order book computing device 102 may use a separate local order book to store local orders received from users of the system 100 that do not match to any order on the consolidated order book. In this example, when the new order is received from a user of the system 100, the at least one processor 204 may place the new order in the separate local order book when the new order does not match any order in the consolidated order book. In other examples, the consolidated order book computing device 102 may use a chosen order book on a chosen asset exchange to store new orders received from users of the system 100 that do not match to any order on the consolidated order book. In this example, when the new order is received from a user of the system 100, the at least one processor 204 may place the new order in the chosen order book of a chosen asset exchange when the new order does not match any order in the consolidated order book. In other examples, the consolidated order book computing device 102 may use the consolidated order book to store new orders received from users of the system 100 that do not match to any order on the consolidated order book. In this example, when the new order is received from a user of the system 100, the at least one processor 204 may place the new order in the consolidated order book when the new order does not match any order in the consolidated order book.

When the new order (e.g., received at the consolidated order book computing device 102 from a user of the system 100) matches an order in the consolidated order book that corresponds to a particular order on a particular order book of a particular asset exchange, the at least one processor 204 may communicate 514 one or more custodial orders to the particular asset exchange to attempt to match the new order on the particular asset exchange using custodial assets for the user of the system.

After the custodial order is sent to the particular asset exchange, the at least one processor 204 may continue to monitor for confirmation or failure notifications relating to the custodial order. In examples, the at least one processor 204 may determine 516 whether the particular asset exchange matched the custodial order to the particular order on the particular asset exchange and whether a transaction of the custodial order and the particular order on the particular asset exchange was executed. When the particular asset exchange matches the custodial order to the particular order and a transaction of the custodial order and the particular order on the particular asset exchange is executed using the custodial assets for the user of the system, the at least one processor 204 may remove 518 the new order from the consolidated order book corresponding to the particular order on the particular asset exchange. This removal may occur through an update of the consolidated order book based on information regarding the order books for the asset exchanges, including the particular order book of the particular asset exchange. The particular order book of a particular asset exchange may also be updated to reflect the matching of the custodial order.

However, if the asset exchange does not match the custodial order to a particular order or and/or the transaction of the custodial order and the particular order on the particular asset exchange is not executed, the at least one processor 204 may place 512 the new order in at least one of the consolidated order book, the separate local order book on the consolidated order book computing device 102, or at least one of the order books of an asset exchange. The custodial order mismatch at the asset exchange (following successful match to the consolidated order book at the consolidated order book computing device 102) may occur because the consolidated order book had not yet been updated to show that the matching order had already been removed from the particular order book of the particular asset exchange. Alternatively, or additionally, the custodial mismatch may occur because the matched order was removed from the particular order book of the particular asset exchange after it was matched to the new order in the consolidated order book, but before the custodial order could be matched with the particular order on the particular asset exchange and the transaction of the custodial order and the particular order on the particular asset exchange could be executed.

Figure 6:
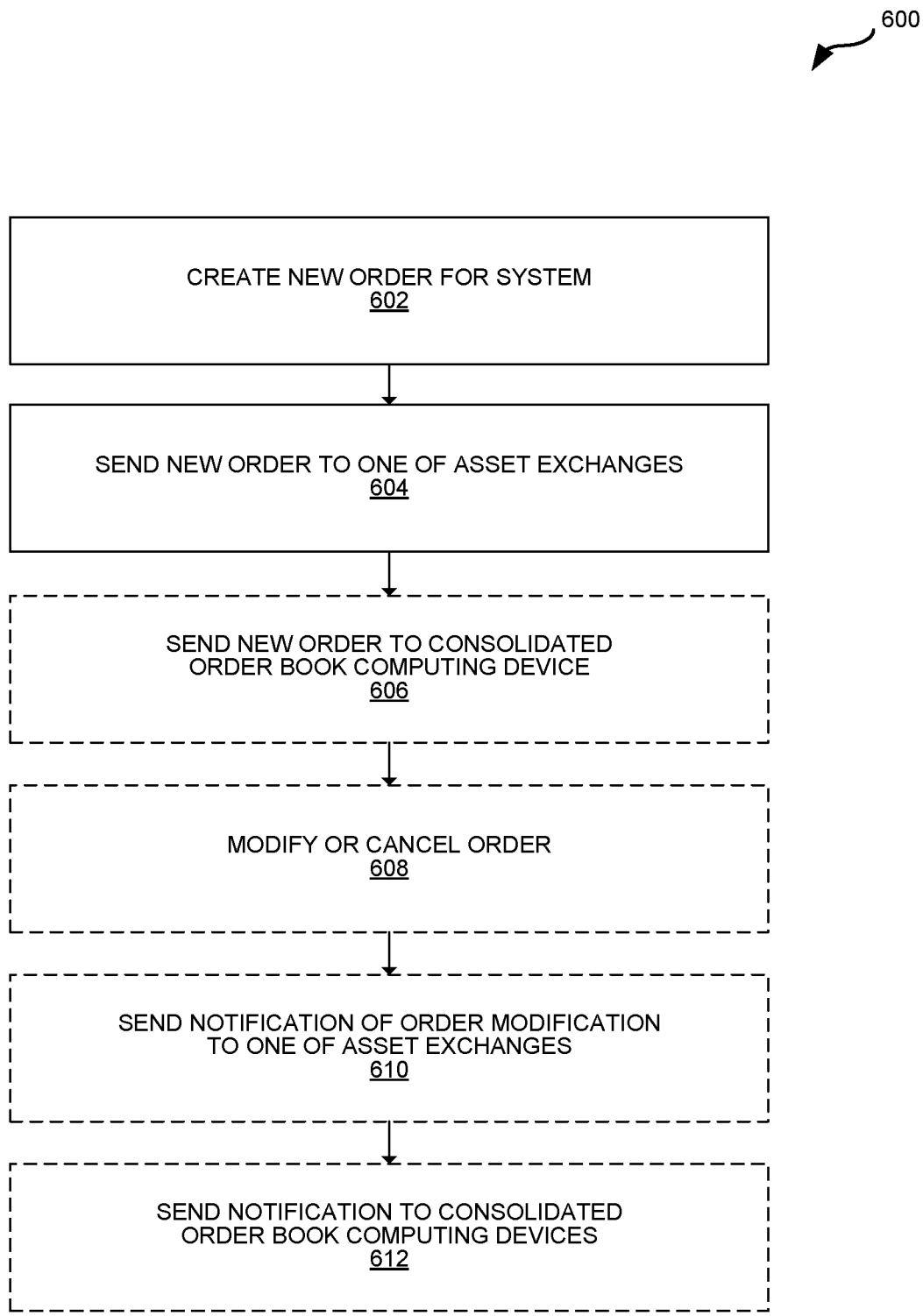
FIG. 6 is a flow diagram of an exemplary method for utilizing a consolidated order book with at least one asset exchange.

FIG. 6 is a flow diagram of an exemplary method 600 for utilizing a consolidated order book with at least one asset exchange. The method 600 may be performed by a customer computing device 104. Specifically, the method 600 may be performed by at least one processor 304 executing instructions stored in at least one memory 302. The at least one processor 304 may create 602 a new order for the system 100, e.g., based on user input and/or automated instructions. The order(s) may relate to transactions for cryptocurrency, digital currency, fiat currency, securities, bonds, commodities, real property, personal property, a fund, a currency fund, an exchange traded fund, a mutual fund, an index fund, a bond fund, a commodity fund, and/or a real estate fund. The order(s) may include public addresses for accounts participating in the trade (such as a transmitting account and/or a target account), an indication of the asset being traded, and the quantity of the asset being traded. The at least one processor 304 may also be configured to send 604 the new order to one of the asset exchanges and, optionally, send 606 the new order to the consolidated order book computing device 102.

The at least one processor 304 may optionally also be configured to modify or cancel 608 the order, e.g., based on further user input and/or automated instructions. Various parameters of an order may be modified without canceling the order, e.g., limit price, stop price a quantity of the asset being traded, whether the user is willing to accept partial fill of the order, duration of the order, etc. When an order is modified or canceled, the at least one processor 304 may also be configured to send 610 a notification of the order modification to one of the asset exchanges and, optionally, send 612 a notification to the consolidated order book computing device 102.

Figure 7:
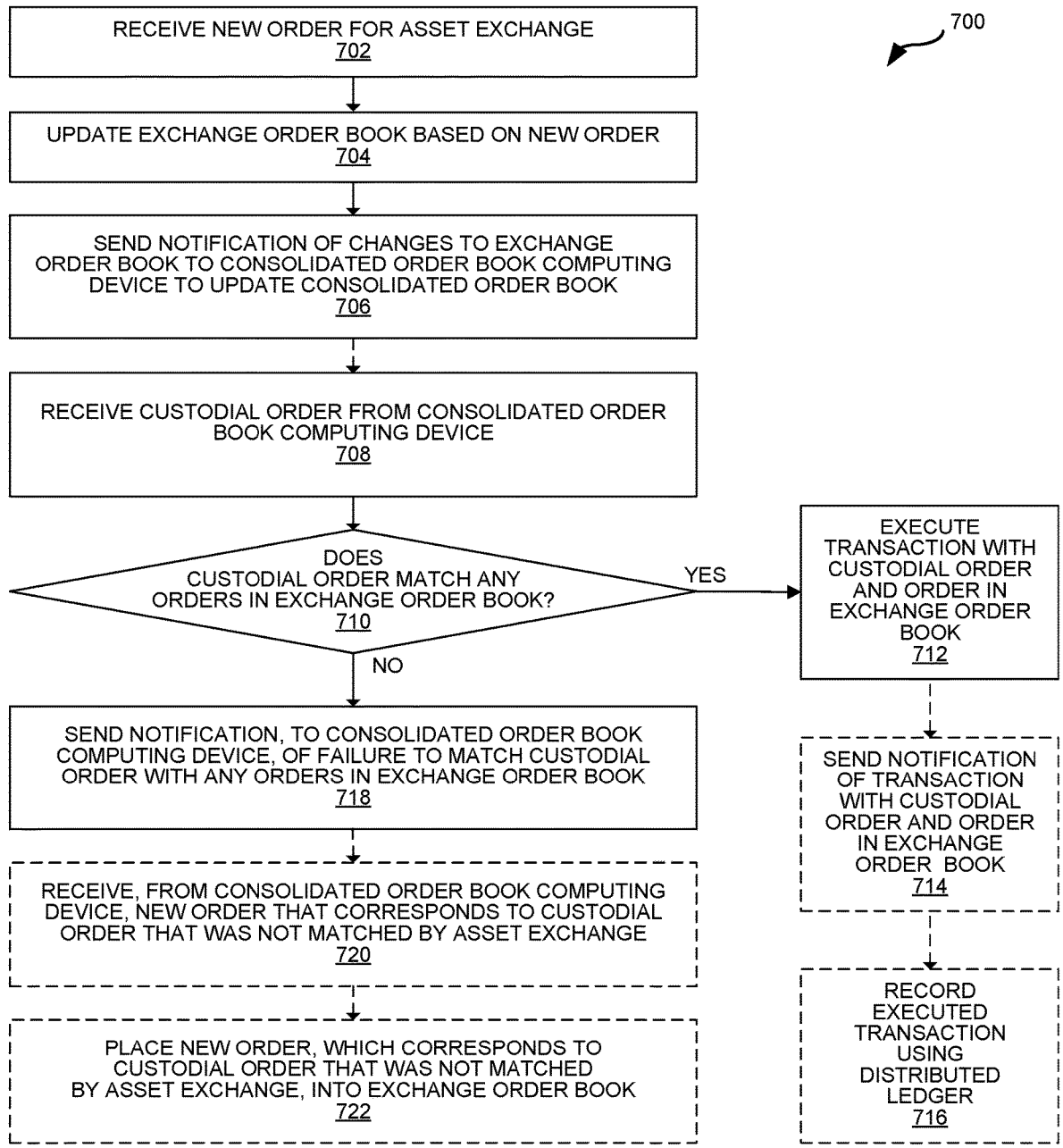
FIG. 7 is a flow diagram of an exemplary method for utilizing a consolidated order book with at least one asset exchange.

FIG. 7 is a flow diagram of an exemplary method 700 for utilizing a consolidated order book with at least one asset exchange. The method 700 may be performed by a particular asset exchange. Specifically, the method 700 may be performed by at least one processor 404 executing instructions stored in at least one memory 402. The at least one processor 404 may receive 702 a new order for a particular asset exchange. Upon receiving the new order, the at least one processor 404 may update 704 an exchange order book based on the new order. The exchange order book may be a collection of orders awaiting execution on a particular asset exchange. The new order may be received from a user of the particular asset exchange (either directly on the exchange computing device 108 or via a customer computing device 104) or received from the consolidated order book computing device 102. Additionally, the at least one processor 404 may also be configured to send 706 a notification of changes (e.g., creation, modification, cancellation of orders) to the exchange order book to the consolidated order book computing device 102 to update the consolidated order book.

The at least one processor 404 may also be configured to receive 708 a custodial order from a consolidated order book computing device 102. The custodial order may be based on the notification of changes sent to the consolidated order book computing device 102. Alternatively, the custodial order may be generated at the consolidated order book computing device 102 based on a notification or order it receives from a different asset exchange. Upon receiving the custodial order, the at least one processor 404 may determine 710 whether the custodial order matches any orders in the exchange order book. The matching may include matching a plurality of single custodial order to a single order in the exchange order book, a single custodial order to multiple orders in the exchange order book, multiple custodial orders to a single order in the exchange order book, and/or multiple custodial orders to multiple orders in the exchange order book.

When the at least one processor 404 is able to match the custodial order with a particular order in the exchange order book, the at least one processor 404 may execute 712 a transaction with the custodial order and the particular order in the exchange order book. If the custodial order matches with a particular order in the exchange order book, the at least one processor 404 may send 714 a notification (e.g., to the consolidated order book computing device 102 and, optionally, a customer computing device 104) of the transaction with the custodial order and the particular order in the exchange order book. When the custodial order matches a particular order in the exchange order book, the at least one processor 404 may record 716 the executed transaction using a distributed ledger during execution of the transaction, e.g., on a blockchain.

However, if the custodial order does not match any orders in the exchange order book, the at least one processor 404 may send 718 a notification, to the consolidated order book computing device 102, indicating a failure to match the custodial order with any orders in the exchange order book. The at least one processor 404 may optionally receive 720, from a consolidated order book computing device 102, a new order that corresponds to a custodial order that was not matched by the asset exchange. The at least one processor 404 may also optionally place 722 the new order, which corresponds to the custodial order that was not matched by the asset exchange, into the exchange order book.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 8:
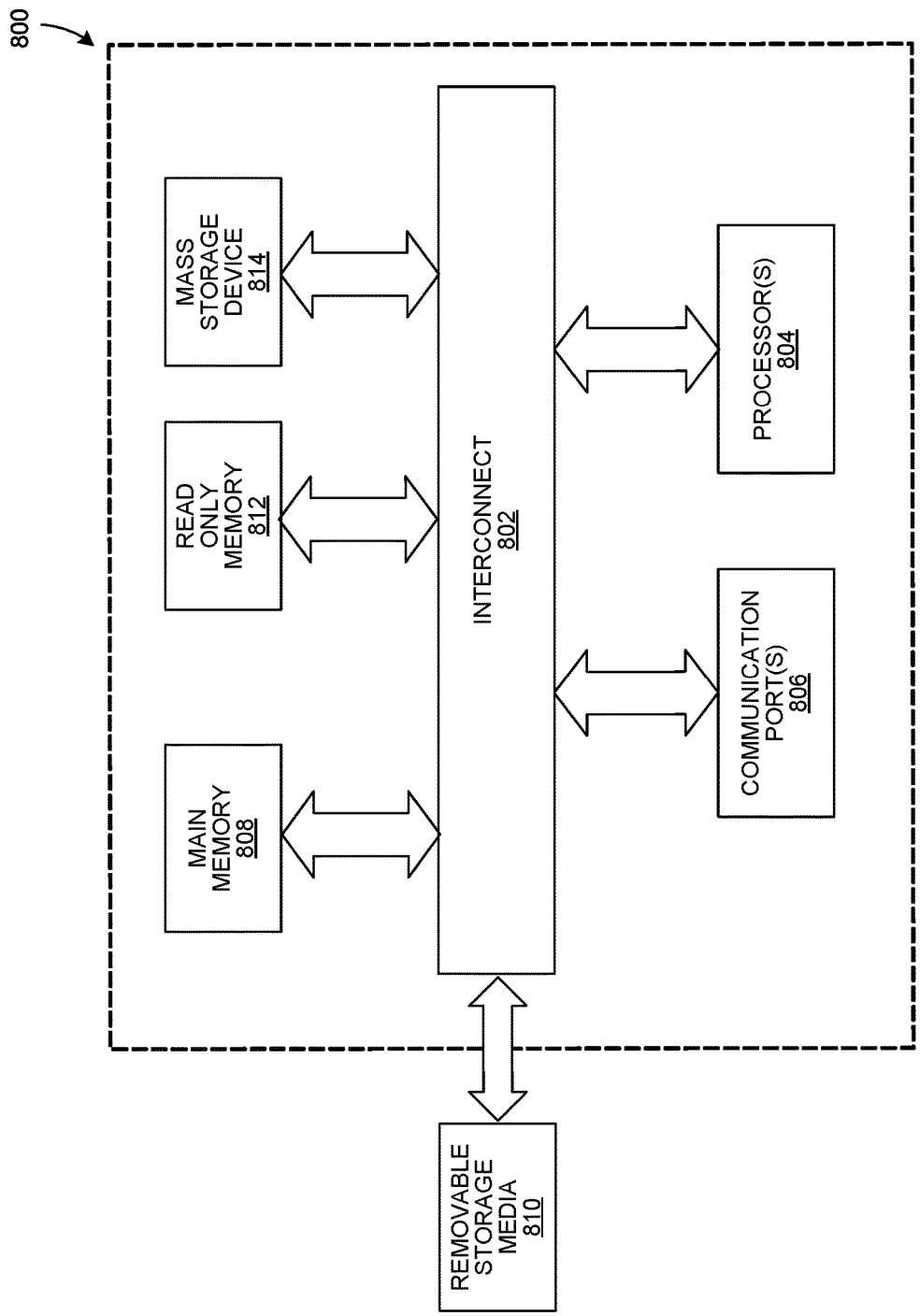
FIG. 8 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes an interconnect 802, at least one processor 804, at least one communication port 806, at least one main memory 808, at least one removable storage media 810, at least one read only memory 812, and at least one mass storage device 814.

The at least one processor 804 can be any known processor. The at least one communication port 806 can be or include, for example, any of an RS-232 port for use with a modem-based dialup connection, a 10/100 Ethernet port, or a Gigabit port using copper or fiber. The nature of the at least one communication port 806 may be chosen depending on a network such a Local Area Network (LAN), Wide Area Network (WAN), or any network to which the computer system 800 connects. The at least one main memory 808 can be Random Access Memory (RAM), or any other dynamic storage device(s) commonly known in the art. The at least one read only memory 812 can be any static storage device(s) such as Programmable Read Only Memory (PROM) chips for storing static information such as instructions for the at least one processor 80.

The at least one mass storage device 814 can be used to store information and instructions. For example, hard disks such as the Adaptec® family of SCSI drives, an optical disc, an array of disks such as RAID, such as the Adaptec family of RAID drives, or any other mass storage devices may be used. Interconnect 802 can be or include one or more buses, bridges, controllers, adapters, and/or point-to-point connections. Interconnect 802 communicatively couples the at least one processor 804 with the other memory, storage, and communication blocks. Interconnect 802 can be a PCI/PCI-X or SCSI based system bus depending on the storage devices used. The at least one removable storage media 810 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for utilizing a consolidated order book with multiple asset exchanges. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system for utilizing a consolidated order book with a plurality of asset exchanges, comprising: at least one processor; at least one memory communicatively coupled to the at least one processor; at least one network interface communicatively coupled to the at least one processor and configured to receive information regarding a plurality of order books from the plurality of asset exchanges; wherein the at least one processor is configured to receive the information regarding the plurality of order books for the plurality of asset exchanges from the at least one network interface; wherein the at least one processor is configured to update the consolidated order book based on information regarding the plurality of order books for the plurality of asset exchanges and for local orders received from users of the system; wherein the at least one processor is configured to track any resting orders on the plurality of order books from the plurality of asset exchanges and any local resting orders resulting from local orders received from users of the system; and wherein the at least one processor is configured to, when a new order is received from a user of the system: determine whether the new order matches any orders in the consolidated order book; when the new order does not match any order in the consolidated order book, placing the new order in at least one of the consolidated order book, a separate local order book, or at least one of the plurality of order books of the plurality of asset exchanges; when the new order matches an order in the consolidated order book that corresponds to a particular order on a particular order book of a particular asset exchange of the plurality of asset exchanges, communicate a custodial order to the particular asset exchange to attempt to match the new order on the particular asset exchange using custodial assets for the user of the system; when the custodial order matches the particular order on the particular asset exchange and a transaction of the custodial order and the particular order on the particular asset exchange is executed using the custodial assets for the user of the system, remove the new order from the consolidated order book corresponding to the particular order on the particular asset exchange; and when the custodial order does not match the particular order on the particular asset exchange or the transaction of the custodial order and the particular order on the particular asset exchange is not executed, placing the new order in at least one of the consolidated order book, a separate local order book, or at least one of the plurality of order books of the plurality of asset exchanges.

Example 2 includes the system of Example 1, further comprising: wherein the system uses the separate local order book to store local orders received from users of the system that do not match to any order on the consolidated order book by having the at least one processor configured to, when the new order is received from a user of the system: when the new order does not match any order in the consolidated order book, placing the new order in the separate local order book; when the custodial order does not match the particular order on the particular asset exchange, placing the new order in the separate local order book.

Example 3 includes the system of any of Examples 1-2, further comprising: wherein the system uses a chosen order book of a chosen asset exchange of the plurality of asset exchanges to store local orders received from users of the system that do not match to any order on the consolidated order book by having the at least one processor configured to, when the new order is received from a user of the system: when the new order does not match any order in the consolidated order book, placing the new order in the chosen order book of the chosen asset exchange by placing the new order at the chosen asset exchange; when the custodial order does not match the particular order on the particular asset exchange, placing the new order in the chosen order book of the chosen asset exchange by placing the new order at the chosen asset exchange.

Example 4 includes the system of any of Examples 1-3, further comprising: wherein the system uses the consolidated order book to store local orders received from users of the system that do not match to any order on the consolidated order book by having the at least one processor configured to, when the new order is received from a user of the system: when the new order does not match any order in the consolidated order book, placing the new order in the consolidated order book; when the custodial order does not match the particular order on the particular asset exchange, placing the new order in the consolidated order book.

Example 5 includes the system of any of Examples 1-4, wherein the at least one processor is configured to generate the consolidated order book based on information regarding the plurality of order books for the plurality of asset exchanges and for local orders received from users of the system.

Example 6 includes the system of any of Examples 1-5, further comprising when the custodial order matches the particular order on the particular asset exchange and the transaction of the custodial order and the particular order on the particular asset exchanges is executed using the custodial assets for the user of the system: the particular order book of the particular asset exchange is updated to reflect the matching of the custodial order; and the at least one processor is configured to remove the new order from the consolidated order book corresponding to the particular order on the particular asset exchange through an update of the consolidated order book based on information regarding the plurality of order books for the plurality of asset exchanges, including the particular order book of the particular asset exchange.

Example 7 includes the system of any of Examples 1-6, wherein the custodial order does not match the particular order on the particular asset exchange even though the new order matched the new order on the consolidated order book because at least one of: the consolidated order book data had not yet been updated to show that the matching order had already been removed from the particular order book of the particular asset exchange; or the matching order was removed from the particular order book of the particular asset exchange after it was matched to the new order in the consolidated order book, but before the custodial order matched to the particular order on the particular asset exchange and the transaction of the custodial order and the particular order on the particular asset exchange is executed.

Example 8 includes the system of any of Examples 1-7, wherein at least one of the plurality of asset exchanges records executed transactions using a distributed ledger during execution of the transaction.

Example 9 includes the system of Example 8, wherein the distributed ledger is a blockchain.

Example 10 includes the system of any of Examples 1-9, wherein at least one of the plurality of asset exchanges is configured to exchange at least one of: at least one cryptocurrency, at least one digital currency, at least one fiat currency, or at least one commodity currency.

Example 11 includes the system of any of Examples 1-10, wherein at least one of the plurality of asset exchanges is configured to exchange at least one of: at least one security, at least one bond, at least one commodity, at least one real estate, and at least one personal property, at least one fund, at least one currency fund, at least one exchange traded fund, at least one mutual fund, at least one index fund, at least one bond fund, at least one commodity fund, or at least one real estate fund.

Example 12 includes the system of any of Examples 1-11, wherein the custodial assets of the system are stored in an escrow account for a plurality of users of the system; and wherein the at least one processor is configured to track individual assets for the plurality of users.

Example 13 includes the system of any of Examples 1-12, wherein the at least one processor is further configured to, when the new order is received from a user of the system: when the new order partially matches a plurality of orders in the consolidated order book that correspond to a plurality of orders on at least one particular order book of at least one particular asset exchange of the plurality of asset exchanges, which orders if executed would effectively result in a complete match, communicate a plurality of custodial orders to the at least one particular asset exchange to attempt to match a plurality of portions of the new order with a plurality of orders on the at least one particular order book of the at least one particular asset exchange and execute a plurality of transactions of the plurality of custodial orders and the plurality of orders on the at least one particular order book.

Example 14 includes the system of Example 13, wherein the at least one processor is further configured to, when the plurality of custodial orders are matched with the plurality of orders on the at least one particular order book and the plurality of transactions of the plurality of custodial orders and the plurality of orders on the at least one particular order book are executed, remove the new order from the consolidated order book corresponding to the plurality of orders on the at least one particular order book.

Example 15 includes the system of any of Examples 13-14, wherein the at least one processor is further configured to, when only a subset of the plurality of custodial orders are matched and executed, adjust the new order from the consolidated order book based on the subset of the plurality of custodial orders that are matched and executed.

Example 16 includes the system of any of Examples 1-15, wherein the at least one processor is further configured to, when the new order is received from the user of the system: when the new order matches a single order in the consolidated order book as well as partially matching a plurality of orders in the consolidated order book that correspond to a plurality of orders on at least one particular order book of at least one particular asset exchange of the plurality of asset exchanges, which orders if executed would effectively result in a complete match, communicate a plurality of custodial orders to the at least one particular asset exchange to attempt to match a plurality of portions of the new order with a plurality of orders on the at least one particular order book of the at least one particular asset exchange and execute a plurality of transactions of the plurality of custodial orders and the plurality of orders on the at least one particular order book.

Example 17 includes a system for utilizing a consolidated order book with an asset exchange, comprising: at least one processor; at least one memory communicatively coupled to the at least one processor; at least one network interface communicatively coupled to the at least one processor and configured to receive a new order from a user of the system; wherein the at least one processor is configured to update an exchange order book based on the new order; wherein the at least one processor is configured to send a notification of changes to the exchange order book to a consolidated order book computing device to update the consolidated order book; wherein the at least one processor is configured to receive a custodial order from the consolidated order book computing device; and wherein the at least one processor is configured to, when a custodial order is received from the consolidated order book computing device: determine whether the custodial order matches any orders in the exchange order book; when the custodial order matches a particular order in the exchange order book, execute a transaction with the custodial order and the particular order in the exchange order book; and when the custodial order does not match any order in the exchange order book, send a notification, to the consolidated order book computing device, indicating a failure to match the custodial order with any orders in the exchange order book.

Example 18 includes the system of Example 17, further comprising: wherein the at least one processor configured to, when the custodial order does not match any order in the exchange order book: receive, from the consolidated order book computing device, the new order that corresponds to the custodial order that did not match any order in the exchange order book; and place the new order, which corresponds to the custodial order that did not match any order in the exchange order book, into the exchange order book.

Example 19 includes the system of any of Examples 17-18, further comprising: wherein the at least one processor is configured to, when the custodial order matches the particular order in the exchange order book, send a notification of the transaction with the custodial order and the particular order in the exchange order book.

Example 20 includes the system of any of Examples 17-19, wherein the at least one processor is configured to, when the custodial order matches the particular order in the exchange order book, record the executed transaction using a distributed ledger during execution of the transaction.

Example 21 includes the system of Example 20, wherein the distributed ledger is a blockchain.

Example 22 includes the system of any of Examples 17-21, wherein the asset exchange is configured to exchange at least one of: at least one cryptocurrency, at least one digital currency, at least one fiat currency, or at least one commodity currency.

Example 23 includes the system of any of Examples 17-22, wherein asset exchange is configured to exchange at least one of: at least one security, at least one bond, at least one commodity, at least one real estate, and at least one personal property, at least one fund, at least one currency fund, at least one exchange traded fund, at least one mutual fund, at least one index fund, at least one bond fund, at least one commodity fund, or at least one real estate fund.

Example 24 includes a method for utilizing a consolidated order book with a plurality of asset exchanges, wherein the method is performed by a consolidated order book computing device, the method comprising: receiving information regarding a plurality of order books from the plurality of asset exchanges; updating the consolidated order book based on information regarding the plurality of order books for the plurality of asset exchanges and for local orders received from users of the system; tracking any resting orders on the plurality of order books from the plurality of asset exchanges and any local resting orders resulting from local orders received from users of the system; and wherein when a new order is received from a user of the system: determining whether the new order matches any orders in the consolidated order book; when the new order does not match any order in the consolidated order book, placing the new order in at least one of the consolidated order book, a separate local order book, or at least one of the plurality of order books of the plurality of asset exchanges; when the new order matches an order in the consolidated order book that corresponds to a particular order on a particular order book of a particular asset exchange of the plurality of asset exchanges, communicating a custodial order to the particular asset exchange to attempt to match the new order on the particular asset exchange using custodial assets for the user of the system; when the custodial order matches the particular order on the particular asset exchange and a transaction of the custodial order and the particular order on the particular asset exchange is executed using the custodial assets for the user of the system, removing the new order from the consolidated order book corresponding to the particular order on the particular asset exchange; and when the custodial order does not match the particular order on the particular asset exchange or the transaction of the custodial order and the particular order on the particular asset exchange is not executed, placing the new order in at least one of the consolidated order book, a separate local order book, or at least one of the plurality of order books of the plurality of asset exchanges.

Example 25 includes the method of Example 24, further comprising: storing, in a separate local order book, local orders received from users of the system that do not match to any order on the consolidated order book when the new order is received from a user of the system, wherein the storing comprises: when the new order does not match any order in the consolidated order book, placing the new order in the separate local order book; when the custodial order does not match the particular order on the particular asset exchange, placing the new order in the separate local order book.

Example 26 includes the method of any of Examples 24-25, further comprising: storing, in a chosen order book of a chosen asset exchange of the plurality of asset exchanges, local orders received from users of the system that do not match to any order on the consolidated order book when the new order is received from a user of the system, wherein the storing comprises: when the new order does not match any order in the consolidated order book, placing the new order in the chosen order book of the chosen asset exchange by placing the new order at the chosen asset exchange; when the custodial order does not match the particular order on the particular asset exchange, placing the new order in the chosen order book of the chosen asset exchange by placing the new order at the chosen asset exchange.

Example 27 includes the method of any of Examples 24-26, further comprising: storing, in the consolidated order book, local orders received from users of the system that do not match to any order on the consolidated order book when the new order is received from a user of the system, wherein the storing comprises: when the new order does not match any order in the consolidated order book, placing the new order in the consolidated order book; when the custodial order does not match the particular order on the particular asset exchange, placing the new order in the consolidated order book.

Example 28 includes a method for utilizing a consolidated order book with an asset exchange, wherein the method is performed by an exchange computing device, the method comprising: receiving a new order from a user of the system; updating an exchange order book based on the new order; sending a notification of changes to the exchange order book to a consolidated order book computing device to update the consolidated order book; receiving a custodial order from the consolidated order book computing device; and wherein, when a custodial order is received from the consolidated order book computing device: determining whether the custodial order matches any orders in the exchange order book; when the custodial order matches a particular order in the exchange order book, executing a transaction with the custodial order and the particular order in the exchange order book; and when the custodial order does not match any order in the exchange order book, sending a notification, to the consolidated order book computing device, indicating a failure to match the custodial order with any orders in the exchange order book.

Example 29 includes the method of Example 28, further comprising: when the custodial order does not match any order in the exchange order book: receiving, from the consolidated order book computing device, the new order that corresponds to the custodial order that did not match any order in the exchange order book; and placing the new order, which corresponds to the custodial order that did not match any order in the exchange order book, into the exchange order book.

Example 30 includes the method of any of Examples 28-29, further comprising: when the custodial order matches the particular order in the exchange order book, sending a notification of the transaction with the custodial order and the particular order in the exchange order book.

Example 31 includes the method of any of Examples 28-30, further comprising: when the custodial order matches the particular order in the exchange order book, recording the executed transaction using a distributed ledger during execution of the transaction.

Example 32 includes the method of Example 31, wherein the distributed ledger is a blockchain.

What is claimed is:

1. A system, comprising:
    at least one processor;
    at least one electronic memory communicatively coupled to the at least one processor; and
    at least one network interface communicatively coupled to the at least one processor and configured to receive data regarding a plurality of order books from a plurality of asset exchanges via at least one network;
    wherein the at least one processor executes instructions stored in the at least one electronic memory, which causes the at least one processor to:
        receive the data regarding the plurality of order books for the plurality of asset exchanges from the at least one network interface;
        store a consolidated order book in the at least one electronic memory;
        update the consolidated order book in real-time based on the data regarding the plurality of order books for the plurality of asset exchanges and for local orders received from users;
        track any resting orders on the plurality of order books from the plurality of asset exchanges and any local resting orders resulting from the local orders received from the users;
        store custodial assets of the system in an escrow account for a plurality of users of the system;
        receive a new order for a first quantity of at least one blockchain-implemented asset from a user;
        determine that the new order matches an order in the consolidated order book that corresponds to a particular order on a particular order book of a particular asset exchange of the plurality of asset exchanges;
        in response to determining that the new order matches the order in the consolidated order book that corresponds to the particular order on the particular order book, consolidate the new order and at least one other order into a custodial order for a second quantity of the at least one blockchain-implemented asset;
        send the custodial order to the particular asset exchange to attempt to match the new order on the particular asset exchange using the custodial assets for the user;
        receive a failure notification for the custodial order from the particular asset exchange; and
        in response to receiving the failure notification, place the order in at least one of the consolidated order book, a separate local order book, or at least one of the plurality of order books of the plurality of asset exchanges.

2. The system of claim 1, wherein the instructions further cause the at least one processor to:
    receive a second order from one of the users;
    determine that the second order does not match to any order on the consolidated order book; and
    place the second order in the separate local order book.

3. The system of claim 1, wherein the instructions further cause the at least one processor to:
    receive a second order from one of the users;
    determine that the second order does not match to any order on the consolidated order book; and
    place the second order in a chosen order book of a chosen asset exchange.

4. The system of claim 1, wherein the instructions further cause the at least one processor to:
    receive a second order from one of the users;
    determine that the second order does not match to any order on the consolidated order book;
    place the second order in the consolidated order book;
    receive a second failure notification for a second custodial order from the particular asset exchange; and
    place the second order in the consolidated order book.

5. The system of claim 1, wherein the instructions are further executable to cause the at least one processor to generate the consolidated order book based on the data regarding the plurality of order books for the plurality of asset exchanges and for the local orders received from the users of the system.

6. The system of claim 1, wherein the instructions further cause the at least one processor to:
    receive a second order from one of the users;
    determine that the second order matches a second particular order on a second particular asset exchange;
    generate and send a second custodial order, for the second order and the second particular order, to the second particular asset exchange; and
    remove the second order from the consolidated order book corresponding to the second particular order on the second particular asset exchange through an update of the consolidated order book based on the data regarding the plurality of order books for the plurality of asset exchanges, including a second particular order book with the second particular order.

7. The system of claim 1, wherein the instructions further cause the at least one processor to:
    receive a second order from one of the users;
    determine that the second order matches a second particular order on a second particular asset exchange;
    generate and send a second custodial order, for the second order and the second particular order, to the second particular asset exchange;
    update, after the second order is matched to the second particular order, the consolidated order book to show that the second particular order had already been removed from the particular order book of the particular asset exchange; and
    receive a second failure notification for the second custodial order from the second particular asset exchange.

8. The system of claim 1, wherein the particular asset exchange records executed transactions on a distributed ledger.

9. The system of claim 8, wherein the distributed ledger is a blockchain.

10. The system of claim 1, wherein at least one of the plurality of asset exchanges exchanges at least one of: at least one cryptocurrency, at least one digital currency, at least one fiat currency, or at least one commodity currency.

11. The system of claim 1, wherein at least one of the plurality of asset exchanges exchanges at least one of: at least one security, at least one bond, at least one commodity, at least one real estate, and at least one personal property, at least one fund, at least one currency fund, at least one exchange traded fund, at least one mutual fund, at least one index fund, at least one bond fund, at least one commodity fund, or at least one real estate fund.

12. The system of claim 1, wherein the instructions, when executed, further cause the at least one processor to:
receive a second order from one of the users;
determine that the second order partially matches a first plurality of orders in the consolidated order book that correspond to a second plurality of orders on at least one particular order book of at least one particular asset exchange of the plurality of asset exchanges, which orders if executed would effectively result in a complete match; and
communicate a plurality of custodial orders to the at least one particular asset exchange for the second order and the second plurality of orders on the at least one particular order book of the at least one particular asset exchange.

13. The system of claim 12, wherein the instructions, when executed, further cause the at least one processor to:
in response to receiving a notification that a plurality of transactions of the plurality of custodial orders and the second plurality of orders on the at least one particular order book were executed, remove the second order from the consolidated order book corresponding to the second plurality of orders on the at least one particular order book.

14. The system of claim 12, wherein the instructions, when executed, further cause the at least one processor to:
in response to receiving a notification that only a subset of the plurality of custodial orders were matched and executed at the at least one particular asset exchange, adjust the second order in the consolidated order book based on the subset of the plurality of custodial orders that were matched and executed.

15. The system of claim 1, wherein the instructions, when executed, further cause the at least one processor to:
receive a second order from one of the users;
determine that the second order matches a single order in the consolidated order book and partially matches a first plurality of orders in the consolidated order book that correspond to a second plurality of orders on at least one particular order book of at least one particular asset exchange of the plurality of asset exchanges, which orders if executed would effectively result in a complete match; and
communicate a plurality of custodial orders to the at least one particular asset exchange for the second order with the second plurality of orders on the at least one particular order book of the at least one particular asset exchange.

16. A method for utilizing a consolidated order book with a plurality of asset exchanges, wherein the method is performed by a consolidated order book computing device, the method comprising:
receiving data regarding a plurality of order books from the plurality of asset exchanges via at least one network;
storing the consolidated order book in at least one electronic memory;
updating the consolidated order book in real-time based on the data regarding the plurality of order books for the plurality of asset exchanges and for local orders received from users;
tracking any resting orders on the plurality of order books from the plurality of asset exchanges and any local resting orders resulting from the local orders received from the users;
storing custodial assets in an escrow account for a plurality of users and track individual assets within the custodial assets for the plurality of users;
receiving a new order for a first quantity of at least one blockchain-implemented asset from a user;
determining that the new order matches an order in the consolidated order book that corresponds to a particular order on a particular order book of a particular asset exchange of the plurality of asset exchanges;
in response to determining that the new order matches the order in the consolidated order book that corresponds to the particular order on the particular order book, consolidating the new order and at least one other order into a custodial order for a second quantity of the at least one blockchain-implemented asset;
sending the custodial order to the particular asset exchange to attempt to match the new order on the particular asset exchange using the custodial assets for the user;
receiving a failure notification for the custodial order from the particular asset exchange; and
in response to receiving the failure notification, placing the new order in at least one of the consolidated order book, a separate local order book, or at least one of the plurality of order books of the plurality of asset exchanges.

17. The method of claim 16, further comprising:
receiving a second order from one of the users;
determining that the second order does not match to any order on the consolidated order book; and
placing the second order in the separate local order book.

18. The method of claim 16, further comprising:
receiving a second order from one of the users;
determining that the second order does not match to any order on the consolidated order book;
placing the second order in a chosen order book of a chosen asset exchange by placing the second order at the chosen asset exchange; and
when the custodial order does not match the particular order on the particular asset exchange, placing the second order in the chosen order book of the chosen asset exchange by placing the second order at the chosen asset exchange.

19. The method of claim 16, further comprising:
receiving a second order from one of the users;
determining that the second order does not match to any order on the consolidated order book;
placing the second order in the consolidated order book;
receiving a second failure notification for a second custodial order from the particular asset exchange; and
placing the second order in the consolidated order book.

20. A system, comprising:
a consolidated order book computing device, comprising:
at least one processor;
at least one electronic memory communicatively coupled to the at least one processor; and at least one network interface communicatively coupled to the at least one processor and configured to receive data regarding a plurality of order books from a plurality of asset exchanges via at least one network;

wherein the at least one processor executes instructions stored in the at least one electronic memory, which causes the at least one processor to:

receive the data regarding the plurality of order books for the plurality of asset exchanges from the at least one network interface;

store a consolidated order book in the at least one electronic memory;

update the consolidated order book in real-time based on the data regarding the plurality of order books for the plurality of asset exchanges and for local orders received from users;

track any resting orders on the plurality of order books from the plurality of asset exchanges and any local resting orders resulting from the local orders received from the users;

store custodial assets of the system in an escrow account for a plurality of users of the system and track individual assets within the custodial assets for the plurality of users;

receive a new order for a first quantity of at least one blockchain-implemented asset from a user;

determine that the new order matches an order in the consolidated order book that corresponds to a particular order on a particular order book of a particular asset exchange of the plurality of asset exchanges;

in response to determining that the new order matches the order in the consolidated order book that corresponds to the particular order on the particular order book, consolidate the new order and at least one other order into a custodial order for a second quantity of the at least one blockchain-implemented asset;

send the custodial order to the particular asset exchanges to attempt to match the new order on the particular asset exchange using the custodial assets for the user;

an exchange computing device, comprising:

at least one second processor;

at least one second memory communicatively coupled to the at least one second processor;

at least one second network interface communicatively coupled to the at least one second processor;

wherein the at least one second processor executes second instructions stored in the at least one second memory, which causes the at least one second processor to:

send notification of changes to the particular order book to the consolidated order book computing device to update the consolidated order book;

receive the custodial order from the consolidated order book computing device;

determine that the custodial order does not match any order in the particular order book; and send a failure notification, to the consolidated order book computing device, indicating a failure to match the custodial order with any orders in the particular order book;

wherein the instructions further cause the at least one processor to place, in response to receiving the failure notification, the new order in at least one of the consolidated order book, a separate local order book, or at least one of the plurality of order books of the plurality of asset exchanges.

* * * * *